US012769933B2

(12) United States Patent
Mcdaid et al.

(10) Patent No.: US 12,769,933 B2
(45) Date of Patent: Oct. 20, 2026

(54) NON-ANONYMOUS FUNCTIONS AS ARGUMENTS IN SPREADSHEET ENVIRONMENTS

(71) Applicant: Microsoft Technology Licensing, LLC, Redmond, WA (US)

(72) Inventors: Joseph John Mcdaid, Seattle, WA (US); Andrew James Becker, Duvall, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 130 days.

(21) Appl. No.: 18/471,058

(22) Filed: Sep. 20, 2023

(65) Prior Publication Data

US 2025/0094697 A1 Mar. 20, 2025

(51) Int. Cl.
*G06F 40/18* (2020.01)

(52) U.S. Cl.
CPC .................................... *G06F 40/18* (2020.01)

(58) Field of Classification Search
CPC ....................................................... G06F 40/18
See application file for complete search history.

(56) References Cited

U.S. PATENT DOCUMENTS

| | | | | |
|---|---|---|---|---|
| 8,645,911 B2 * | 2/2014 | Dorman | G06F 40/18 | 717/106 |
| 8,726,143 B2 * | 5/2014 | Simkhay | G06F 40/18 | 715/219 |
| 9,552,348 B2 * | 1/2017 | Moharir | G06F 40/18 | |
| 10,140,280 B2 * | 11/2018 | Sobhy Deraz | G06F 40/18 | |
| 10,180,934 B2 * | 1/2019 | Ball | G06F 8/40 | |
| 10,466,867 B2 * | 11/2019 | Boucher | G06F 40/194 | |
| 10,540,153 B2 * | 1/2020 | Stachura | G06F 8/38 | |
| 10,699,068 B2 * | 6/2020 | Gross | G06F 40/123 | |
| 10,726,201 B1 * | 7/2020 | Gross | G06F 8/311 | |
| 10,846,469 B2 * | 11/2020 | Sobhy Deraz | G06F 9/543 | |
| 11,017,165 B2 * | 5/2021 | Dvorak | G06F 40/174 | |
| 11,423,218 B2 * | 8/2022 | Keslin | G06F 40/18 | |
| 11,694,023 B2 * | 7/2023 | Dvorak | G06F 17/18 | 715/212 |

(Continued)

OTHER PUBLICATIONS

Balanivash and Electric Coffee, "Passing Function name as arguments to a function"; Oct. 27, 2013, 5 pages, https://stackoverflow.com/questions/6356303/passing-function-name-as-arguments-to-a-function (Year: 2013).*

*Primary Examiner* — Benjamin Smith

(57) ABSTRACT

Technology is disclosed herein by which a spreadsheet function is accepted as an argument to another function in a spreadsheet. In an implementation, a computing apparatus identifies a formula in a cell, the formula including a first function which has a parameter for the name of a second, non-anonymous function. The computing apparatus passes the function name as an argument to the first function for execution. In executing the first function, the computing apparatus calls the second function and passes a value as an argument to the second function. The computing apparatus updates the spreadsheet based on one or more results of the first function. In an implementation, when the first function calls the second function, the first function iterates through a range of values passed to it as an argument.

20 Claims, 8 Drawing Sheets

(56) References Cited

U.S. PATENT DOCUMENTS

| | | | | |
|---|---|---|---|---|
| 11,972,204 | B2 * | 4/2024 | Dvorak | G06F 3/0482 |
| 12,039,258 | B2 * | 7/2024 | Dayal | G06F 40/205 |
| 12,050,859 | B2 * | 7/2024 | Dvorak | G06F 40/18 |
| 12,056,446 | B2 * | 8/2024 | Dvorak | G06F 17/18 |
| 12,169,687 | B2 * | 12/2024 | Dvorak | G06F 40/103 |
| 2006/0036939 | A1 * | 2/2006 | Hobbs | G06F 40/18 715/213 |
| 2006/0161844 | A1 * | 7/2006 | Simkhay | G06F 40/18 715/267 |
| 2010/0269092 | A1 * | 10/2010 | Dorman | G06F 40/18 715/219 |
| 2015/0309980 | A1 * | 10/2015 | Glass | G06F 40/18 715/219 |
| 2015/0378977 | A1 * | 12/2015 | Moharir | G06F 40/18 715/219 |
| 2017/0315979 | A1 * | 11/2017 | Boucher | G06Q 10/101 |
| 2018/0157468 | A1 * | 6/2018 | Stachura | G06F 8/34 |
| 2018/0253413 | A1 * | 9/2018 | Ball | G06F 40/103 |
| 2018/0260373 | A1 * | 9/2018 | Sobhy Deraz | G06F 9/449 |
| 2018/0260374 | A1 * | 9/2018 | Sobhy Deraz | G06F 17/10 |
| 2019/0012306 | A1 * | 1/2019 | Dvorak | G06F 40/16 |
| 2019/0012308 | A1 * | 1/2019 | Dvorak | G06F 40/186 |
| 2020/0004812 | A1 * | 1/2020 | Gross | G06F 40/18 |
| 2020/0302013 | A1 * | 9/2020 | Stegmaier | G06F 40/18 |
| 2021/0406458 | A1 * | 12/2021 | Dvorak | G06F 3/0482 |
| 2021/0406459 | A1 * | 12/2021 | Dvorak | G06F 3/0489 |
| 2022/0012416 | A1 * | 1/2022 | Dvorak | G06F 40/18 |
| 2022/0012417 | A1 * | 1/2022 | Dvorak | G06F 3/0482 |
| 2022/0027555 | A1 * | 1/2022 | Dvorak | G06F 3/0486 |
| 2022/0180049 | A1 * | 6/2022 | Dvorak | G06F 40/18 |
| 2022/0188505 | A1 * | 6/2022 | Keslin | G06F 40/103 |
| 2023/0075557 | A1 * | 3/2023 | Dvorak | G06F 40/18 |
| 2023/0351104 | A1 * | 11/2023 | Dvorak | G06F 40/18 |
| 2024/0028821 | A1 * | 1/2024 | Dvorak | G06F 40/18 |
| 2024/0070382 | A1 * | 2/2024 | Dayal | G06F 16/903 |
| 2024/0193357 | A1 * | 6/2024 | Dvorak | G06F 40/18 |
| 2024/0303426 | A1 * | 9/2024 | Dvorak | G06F 40/18 |
| 2024/0370645 | A1 * | 11/2024 | Dvorak | G06F 17/18 |
| 2025/0013820 | A1 * | 1/2025 | Dvorak | G06F 40/18 |
| 2025/0348661 | A1 * | 11/2025 | Dvorak | G06F 40/18 |

* cited by examiner

NON-ANONYMOUS FUNCTIONS AS ARGUMENTS IN SPREADSHEET ENVIRONMENTS

TECHNICAL FIELD

Aspects of the disclosure are related to the field of computer software applications and, in particular, to spreadsheet applications and associated technology.

BACKGROUND

Spreadsheet applications are computer software programs that allow users to store, organize, and analyze data in tabular form. The rows and columns of a representative worksheet define cells into which data and formulas may be entered. A given cell may simply hold data in it, such as a number or text string, or the cell may contain a formula that automatically calculates a value for the cell. Formulas can also employ functions that perform pre-defined calculations or return information about a spreadsheet. The functions may be pre-built functions provided as part of an application, or user-defined functions created by a user.

In spreadsheet environments, lambda functions are anonymous functions by which a user can define an operation in a cell formula for a limited, specific use. A user can define a lambda function for a complex expression (such as a function with multiple layers of nesting) and invoke the expression using a modular syntax with input values provided as arguments to the lambda function. Lambda functions can also be defined within other functions to pass an expression as argument without having to formally define a function for it. For example, a user might pass an expression to a plotting function to generate a graph of it.

Despite their utility, lambda functions are unfamiliar to many spreadsheet users. In addition, the syntax for lambda functions is somewhat atypical of other more commonly used spreadsheet functionalities. As a result, this functionality is often underutilized.

OVERVIEW

Technology is disclosed herein for spreadsheet operations performed by a computing apparatus. In an implementation, the computing apparatus identifies a formula in a cell of a spreadsheet. The formula includes a first function which has a parameter comprising the name of a second function. The second function is a non-anonymous function. The computing apparatus passes the name of the second function as an argument to the first function, then executes the first function. In executing the first function, the computing apparatus calls the second function and passes a value as an argument to the second function. The computing apparatus populates the spreadsheet based on one or more results of the first function. In an implementation, the first function also has a parameter comprising a range; the first function passes the range as an argument to the second function.

In some implementations, the formula follows a syntax which includes a name of a function followed by a list of parameters captured parenthetically after the name of the function. The list of parameters includes one parameter which identifies another function to be passed as an argument to the function. In the same or other implementations, when the first function calls the second function, the first function iterates through the range passed to it as an argument. For each iteration, the first function calls the second function and passes one or more values from the range. In some implementations, the list of parameters includes a conditional expression, and the first function passes the value in the range if the value satisfies the conditional expression.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
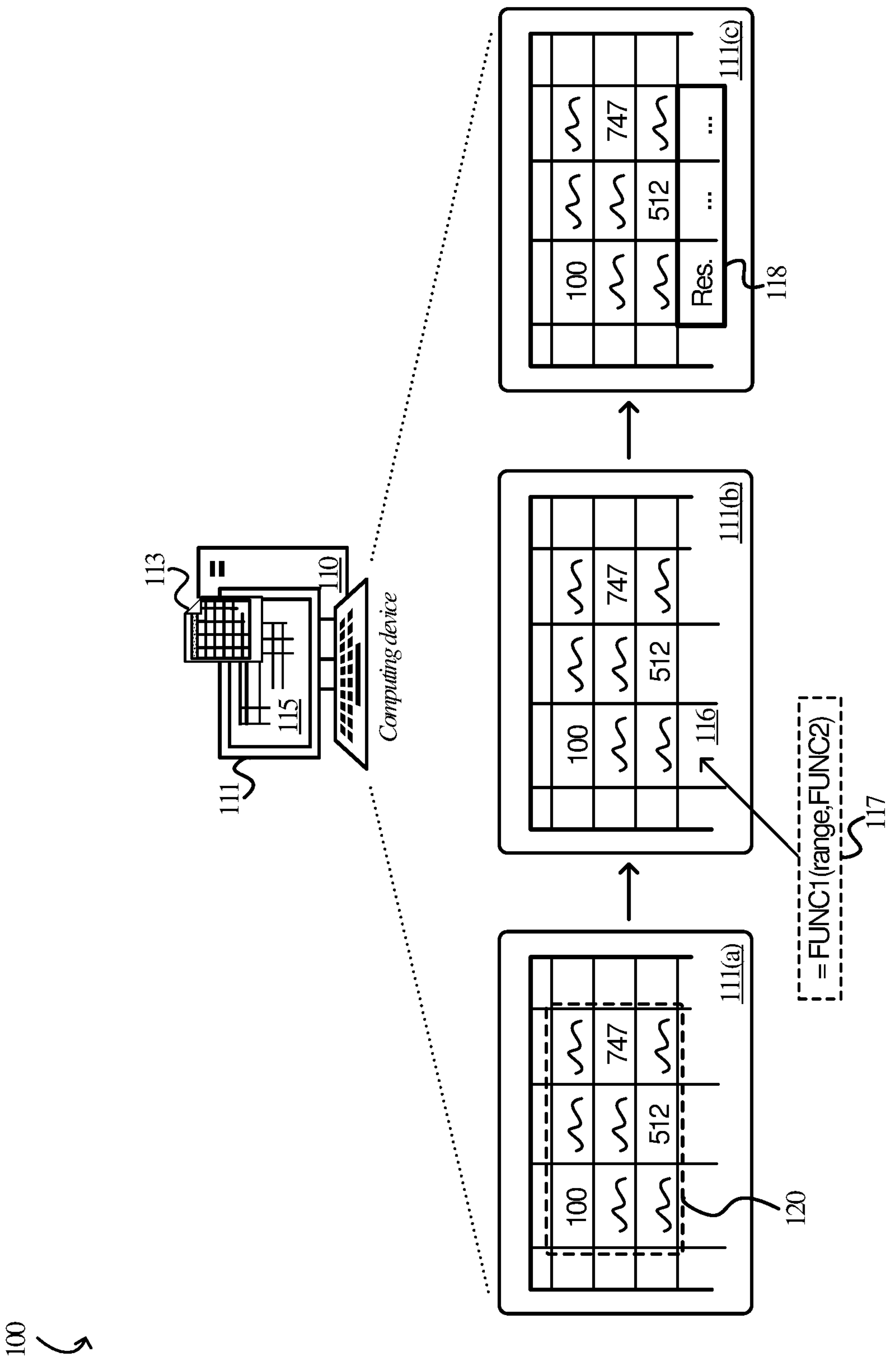
FIG. 1 illustrates an operational environment for accepting a spreadsheet function as an argument of second spreadsheet function in an implementation.

Technology is disclosed herein for a spreadsheet functionality which enables a spreadsheet function to accept another spreadsheet function as an argument. The technology allows aggregated function operations to be created according to a highly simplified and user-friendly syntax, while providing the user with control over the manner of execution and without the use of a lambda function or its more complicated notation. In various implementations, in the formula of a spreadsheet cell, a first spreadsheet function is passed to a second function, rather than evaluated or executed, which causes the first function to execute in a specified manner. For example, the functionality enables a user to compute sums for several columns of data using a single function to which the sum function is passed and for which the cell range is provided, and which specifies the manner in which the sums are to be computed (i.e., by column). The syntax for the streamlined function passing visually distinguishes the operation from a nested function operation and reduces the use of parentheses and redundant characters in formulas, thus making formula entry and debugging easier. The spreadsheet enabled with the above discussed functionality may be hosted by a spreadsheet application, such as Microsoft® Excel, or other productivity application which supports a spreadsheet environment. (Names of spreadsheet functions, such as Excel functions, are indicated herein in all caps.)

In an implementation, a user enters a formula in a cell of a spreadsheet. The formula includes an outer spreadsheet function whose arguments include a name or identifier of a second function and a cell range. The second function is a non-anonymous function, such as a function defined within the application hosting the spreadsheet. When executed, the outer function calls the second function and passes cells to it from within the cell range. In various implementations, when the cells are passed by column or row, the second function processes each column or row, then returns the output values to the outer function. The outer function populates or commits the output values to the cells in the spreadsheet, performs another operation on the output values, or passes the output values to another, higher-order function in the formula.

In a more specific illustration of the use of non-anonymous functions in cell formulas, the Excel function BYCOL is an aggregator function which calls an inner function to execute over a cell range by column. For example, in the cell formula=BYCOL(A2:D8,SUM), the outer function BYCOL iteratively calls the non-anonymous function SUM to sum each of the four columns in the range A2:D8. When the output values (i.e., the four column sums) are returned, BYCOL populates the cell containing the formula and three adjacent cells with the output values.

In various implementations, a non-anonymous function is a function which can be passed to another function by name only, that is, without an argument to the non-anonymous function and lacking function notation. When called by an outer function, the non-anonymous function, lacking an argument of its own, is executed over a cell range which is specified as parameter to the outer function. The name of the non-anonymous function may be a descriptive word (e.g., MEDIAN), abbreviation (e.g., STDEV), or short phrase (e.g., IFERROR). Non-anonymous functions can include functions which are natively defined in the application hosting the spreadsheet, such as functions for mathematical, statistical, logical, text, date, and financial operations, among others. Examples of non-anonymous functions include SUM, PRODUCT, AVERAGE, CONCATENATE, MEDIAN, MAX, and COUNT. A user may also define a named function in a spreadsheet application which serves as a non-anonymous function to be called by an outer function. The non-anonymous function may operate on cell content such as numerical values, text values, date or time values, Boolean values, errors, image data, etc., or on cell metadata, such as metadata relating to cell format or conditional formatting rules.

In various implementations, non-anonymous functions do not include anonymous or lambda functions, which are functions defined using a keyword (e.g., "lambda") and which provide a function definition in terms of a dummy variable. However, a user may define an anonymous function and then name it so it can be passed to an outer function by name only. Notably, the ability to pass a non-anonymous function to the outer function by its name and stripped of any function notation (i.e., arguments or parentheses) eliminates redundant syntactical characters and notation, improves the readability of the cell formula, and makes debugging the formula easier.

In some implementations, the outer function is defined to receive parameters or arguments including at least the name of a non-anonymous function and a cell range, and some implementations may specify multiple ranges or other parameters. At execution, the outer function calls the non-anonymous function to process the cell range. The outer function determines the manner in which the non-anonymous function processes the cell range, whether by column, by row, according to a condition, etc. For example, the outer function may be an aggregation function which computes results by aggregating cells in a particular way, such as by row (e.g., BYROW), by column (e.g., BYCOL), by values in corresponding cells (e.g., GROUPBY), by a condition, and so on.

When aggregating a cell range or array according to the type of outer aggregation function, the outer function may make iterative calls to the non-anonymous function to process the cells according to a particular grouping or subarray. Referring to the example above, the BYCOL function calls the SUM function to evaluate the cell range A2:D8 in column subarrays. Thus, the output of the outer function may include multiple values corresponding to the number of groupings or subarrays.

In some implementations, the outer function calls the non-anonymous function without specifying a range of values. In other words, the parameter list of the outer function may include only the name of the non-anonymous function. For example, the function RAND10(SUM) computes a sum of ten randomly generated values without providing an explicit argument to the non-anonymous function (e.g., without providing a range of cells or values). Similarly, RAND10(MEDIAN) computes the median value of ten randomly generated values without an input range.

In various implementations, for the application or computational engine to recognize a spreadsheet function as a non-anonymous function, the syntax by which a non-anonymous function is passed to an outer function includes a list of arguments or parameters including the non-anonymous function and at least one cell range the values of which are inputs to the non-anonymous function. When an outer function is evaluated, the application or computational engine may identify the non-anonymous function by its position in an argument list, by a particular format in which the non-anonymous function is named, by the function being defined natively or by a user in the application, or by some combination of factors. For example, the outer function may be defined such that the name of the non-anonymous function is the final argument in the list of arguments. In some applications, the definition for the outer function may specify that the final argument is the non-anonymous function name without argument or function notation (e.g., without arguments enclosed in parentheses), which, if present, may cause an error to be thrown. In still other implementations, the syntax for passing a non-anonymous function may be an explicit indication, such as enclosing the name of the non-anonymous function within quotation marks or other syntactical characters or prepending an identifier (e.g., eta:SUM).

The outer function which calls a non-anonymous function may be overloaded with multiple function definitions, such as one definition including a cell range parameter and name parameter for the non-anonymous function and another definition which receives a conditional parameter as well. Indeed, spreadsheet functions can include a definition that has no parenthetical argument list indicating that the function is to be treated as a non-anonymous function. The cell range provided as a parameter of an outer function may be an array of cells of varying size and dimension, such as a column of cells values (e.g., A2:A25), a row of cells (e.g., B1:J1), or a two-dimensional array of cells (e.g., A1:J10). A cell range may also be a single cell (e.g., D10). Alternatively, an argument or parameter of an outer function definition may be one or more values to be passed to and evaluated by the non-anonymous function. For example, the function CONDITIONALSUM may include one definition for cell ranges and another for numerical values. Thus, the formula=CONDITIONALSUM(A1:A4,ISPOSITIVE) sums the positive values of the cells A1:A4, while the formula=CONDITIONALSUM({1,2,5,−3},ISPOSITIVE) sums the positive values of the numerical array to return a value of 8. In still other embodiments, the argument can include cell references, as in =CONDITIONALSUM({A1, B2,C4,D6},ISPOSITIVE) which returns a result based on the values of the cells A1, B2, C4, and D6. The values passed to the non-anonymous function can be numerical values, string values, or other types of values.

The list of arguments of the outer function also includes at least one cell range to which the non-anonymous function is to be applied. For some outer functions, the list of arguments may include a second cell range by which values in the first cell range are to be categorized or classified. Thus, beyond the grouping specified by the outer function (e.g., BYROW), the cells may be further subdivided according to category. Each group of cells or categorized group of cells is then processed by the non-anonymous function to generate a result for that group.

Still another argument of the list of arguments to the outer function may be a Boolean or conditional expression by which cell values are first evaluated before being processed by the non-anonymous function. For example, for an array of cells which includes positive and negative values, a sum of only the non-negative values can be generated by evaluating each of the cell values according to the conditional argument ">0" before passing the values resulting in True to the SUM function. In an alternative implementation, a non-anonymous function ISPOSITIVE in the argument list of an outer function will select the positive values in a specified array for evaluation by the outer function. For example, the function expression CONDITIONALSUM (A1:A100,ISPOSITIVE) will sum all the positive values in the range A1:A100.

In some implementations, the outer function passes or returns the non-anonymous function without executing it (i.e., without processing any values with it). For example, an outer function including a conditional parameter and a non-anonymous function may pass the non-anonymous function when the conditional parameter evaluates to True. The outer function may also be defined to receive multiple non-anonymous functions as arguments. The names of one or more of the non-anonymous functions may be passed by the outer function to another function based on the evaluation of a conditional parameter. For example, in the spreadsheet function=BYROW(I6:M10,IF(K2=1,SUM,AVERAGE)), the outer function IF includes a conditional parameter (K2=1) and two non-anonymous functions, SUM and AVERAGE. At execution, the outer function IF returns one of the two non-anonymous functions without execution depending on whether the value of cell K2 is equal to 1 (SUM if True, AVERAGE if False) and passing the non-anonymous function to the second outer function BYROW. The second outer function then executes the passed function on values in each row of the range I6:M10, summing the values if K2 is equal to 1, and averaging the values if K2 is not equal to 1. In this example, the array I6:M10 contains five rows of cells, so the results of the execution of BYROW generates five output values.

The preceding example further illustrates the concept of nesting an outer function in a higher order function. The higher order function receives the output generated by the outer function and performs some operation with respect to the output. As illustrated, the outer function IF is nested within the higher order function BYROW, and the output of IF (a non-anonymous function name) is passed to BYROW. BYROW receives a non-anonymous function argument (passed, in this example, by the IF function) and iteratively calls the non-anonymous function to process the cell range by row.

The spreadsheet application may include spreadsheet functions which produce output in the form of a cell array the dimensions of which are determined at execution based on the dimensions an input cell array or on values of the input cell array. The multiple outputs of a function are spilled into multiple adjacent cells to form a row, a column, or a table of cells with new or updated values corresponding to the multiple results of the evaluation performed by the function. For example, referring to the example above, when BYCOL generates sums for the four columns of the array A2:D8, the application displays an updated value for the cell in which the formula was entered along with updated values for three cells adjacent to the formula cell. The set of new or updated output values may be visually indicated to the user, such as by a cell border, and the three cells not containing the cell formula may be uneditable as their values are based on the cell formula in another cell.

Technical effects of the technology disclosed herein include simplifying the passing of a non-anonymous function as an argument to another function for processing a cell array. In particular, by defining the outer function to receive a non-anonymous function by name only, at least one set of parentheses is eliminated, and the syntax more clearly indicates that the inclusion of the non-anonymous function is not as a nested operation. Moreover, other redundant syntactical characters, such as dummy variables used in lambda function definitions, are eliminated, reducing the length of the cell formula, improving readability, and making debugging easier.

Beyond the improvements to the syntax, the technology disclosed herein enables the use of a single, flexible function in place of a sea of minor variants. For example, in Microsoft Excel, in the formula SUBTOTAL(9,A1:A100), the SUBTOTAL function is defined across a limited set of functions which are not specified by name but rather by an index value ("9"), and any function not included in the definition of SUBTOTAL is unable for use. In contrast, by allowing outer functions to receive an any non-anonymous function including user-defined functions, there is no hard limit on the number of functions which can be passed to the outer function. Thus, the above example could be accomplished with the formula SUBTOTAL(SUM,A1:A100) in a more readable expression.

Turning now to the Figures, FIG. 1 illustrates operational scenario 100 for spreadsheet applications including functionality for accepting a spreadsheet function as an argument of second spreadsheet function in an implementation. Operational scenario 100 includes computing device 110 which hosts a local runtime environment of a spreadsheet application. Computing device 110 displays user experience 111 (shown in various stages of operation as user experiences 111(*a*), 111(*b*), and 111(*c*)) of a spreadsheet application. Workbook 113 is representative of spreadsheet workbooks opened in the context of the spreadsheet application on computing device 110 and displayed as spreadsheet 115 in user experience 111.

Computing device 110 is representative any computing device capable of running a spreadsheet application, examples of which include desktop and laptop computers, tablet computers, mobile phones, and the like. Examples of suitable spreadsheet applications include locally installed and executed applications, web-based applications that are executed in the context of a local web-browser application, and any variation or combination thereof. In some implementations, representative spreadsheet applications may be embedded in other applications and in accordance with numerous other frameworks including embedded frameworks and distributed frameworks.

In brief operational example of the technology disclosed herein, spreadsheet 115 is displayed in user experience 111(*a*) and includes range 120 of spreadsheet cells. In user experience 111(*b*), a user commits input 117 into cell 116 including a cell formula. The cell formula includes an outer function "FUNC1" with two arguments, "range" and "FUNC2." (For the purposes of illustration, it is assumed that "range" in input 117 refers to range 120.) FUNC1 is representative of a spreadsheet function which receives at least two arguments including a cell range and a non-anonymous function. FUNC2 is representative of a non-anonymous spreadsheet function. When input 117 is committed to cell 116, FUNC1 calls FUNC2 to process cells in range 120. The spreadsheet application populates cells 118, including cell 116 and adjacent cells, based on the output values generated by FUNC2 processing range 120.

Figure 2:
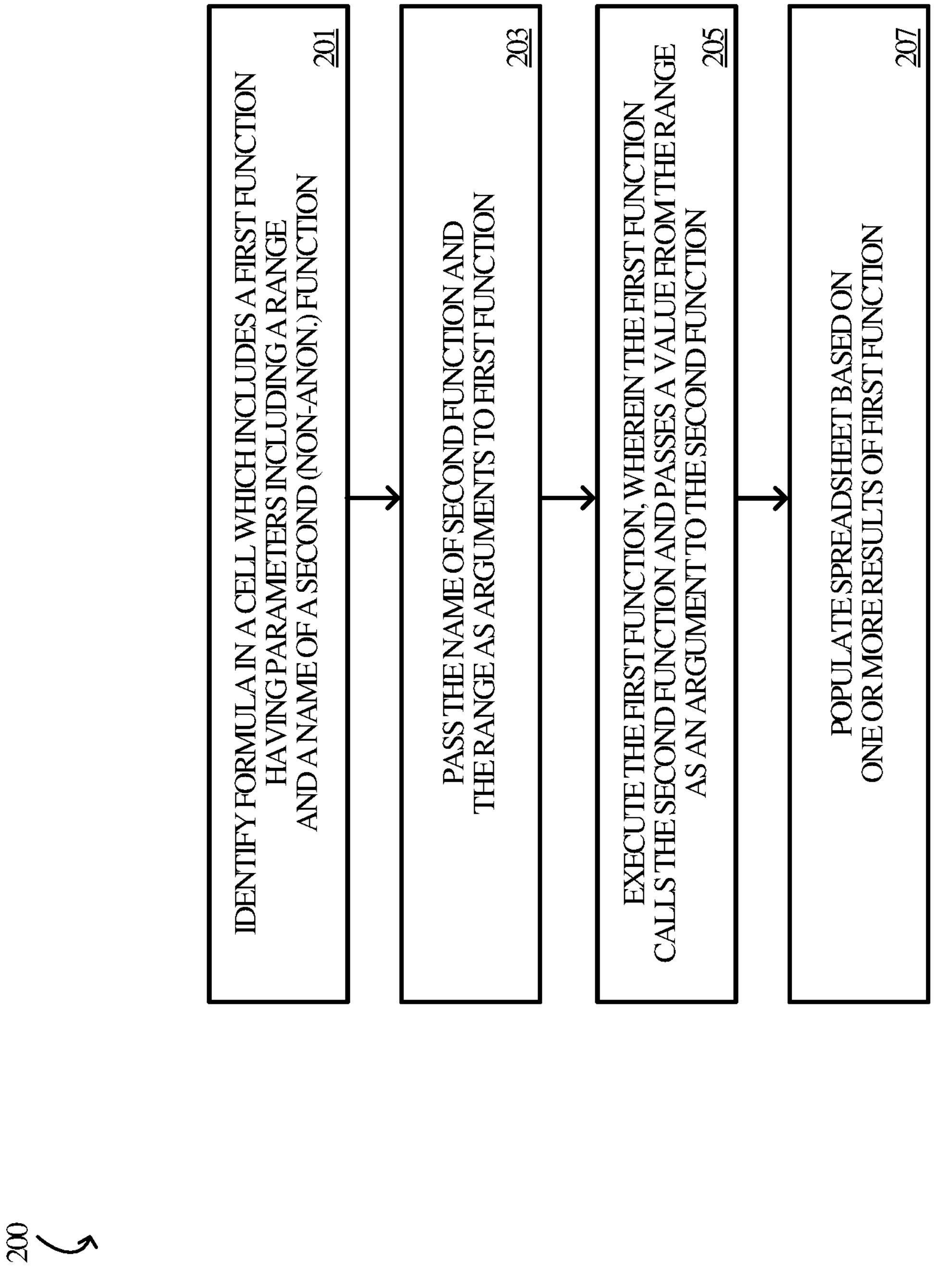
FIG. 2 illustrates a process for accepting a spreadsheet function as an argument of second spreadsheet function in an implementation.
Figure 7:
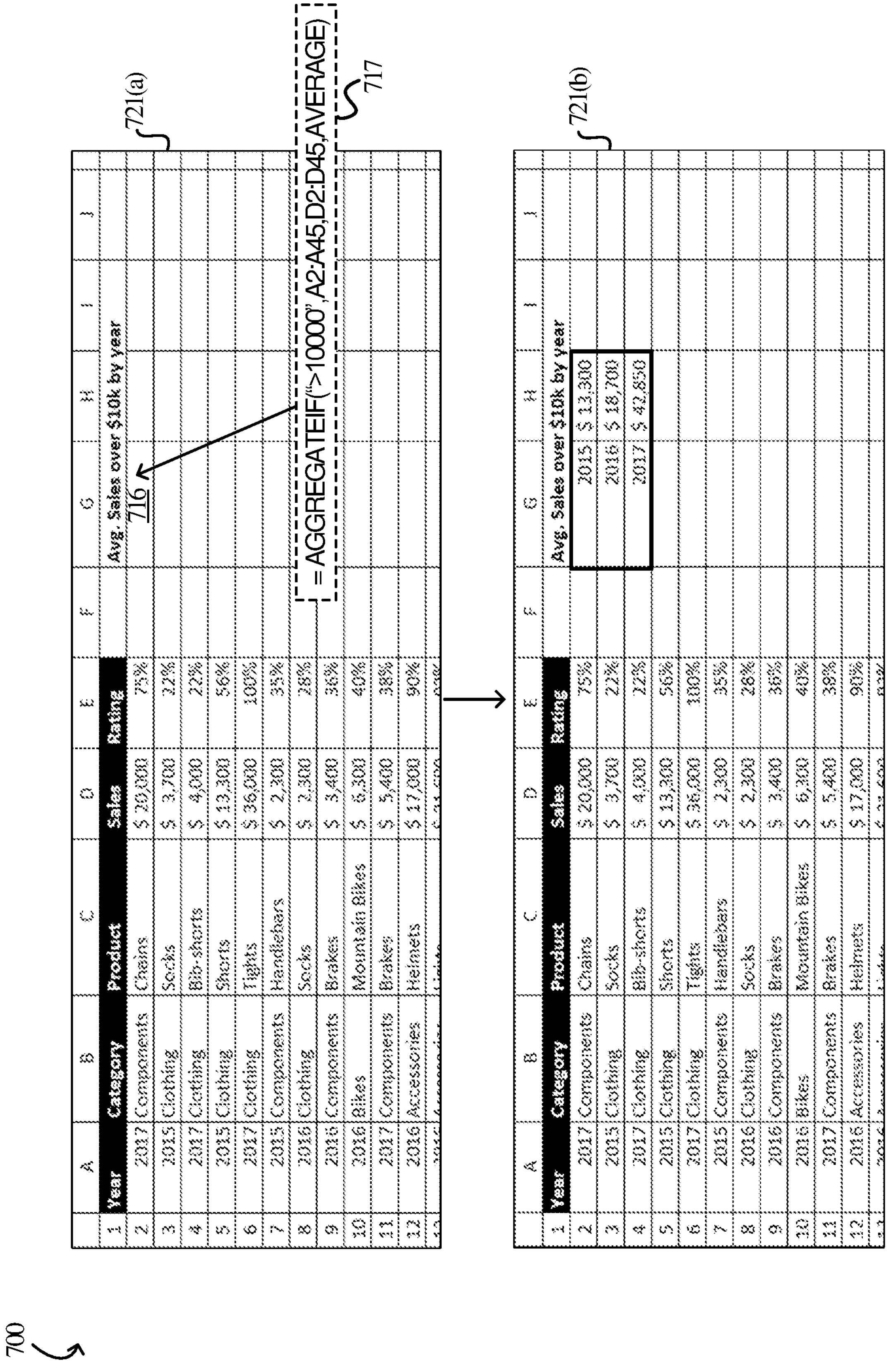
FIG. 7 illustrates an operational scenario for accepting a spreadsheet function as an argument of second spreadsheet function in an implementation.

FIG. 2 illustrates process 200 of operating a spreadsheet application which includes functionality for accepting a spreadsheet function as an argument of second spreadsheet function in an implementation. Process 200 is implemented in program instructions in the context of a software application and executes on a suitable computing device, of which computing device 801 of FIG. 7 is representative. The program instructions direct the computing device to operate as follows, referring parenthetically to the steps in FIG. 2.

In operation, a computing device identifies a formula in a cell which includes a first function having parameters including a range and a name of a second, non-anonymous function (step 201). In an implementation, a user enters the formula in the cell of a spreadsheet which includes a first function and a list of parameters to the first function. The first function is a spreadsheet function defined to receive a list of parameters or arguments including at least a cell range or array and the name of a non-anonymous function. The first function may include an aggregator function which aggregates cells in a cell range into subarrays according to a common characteristic, such as by column, by row, by format, by value or content, and so on.

The formula embodies a syntax by which the non-anonymous function is passed to the first function. In an implementation, the list of parameters is a comma-delimited list enclosed within parentheses appended to the name of the first function. Positions in the list indicate the purpose or use of the parameter. For example, the first parameter in the list may indicate a range of cells which are to be processed by the second, non-anonymous function. Other parameters in the list may include a second range or array of cells by which the (first) range of cells is further categorized or a conditional expression by which to determine whether a particular cell value is to be included in the processing. The range or array of cells can vary in size or dimension. For example, an array may be a single cell. Still other functions may omit a range, array, scalar value, or other argument and provide only the non-anonymous function name (e.g., RAND10( ) which generates values to pass to a non-anonymous function). In some implementations, the first function may be defined to accept a spill range.

The syntax may also define the final position in the parameter list as indicating the name of the second, non-anonymous function which is to process the cell range. The non-anonymous function is a function which is native to or defined in the application hosting the spreadsheet and which has a unique name by which the function or its particular operation is called. According to the syntax, the parameter for the non-anonymous function is provided in a specific format which the first function is defined to accept. For example, the name parameter for the non-anonymous function may take the form of the function's unique name absent any arguments or input values and lacking function notation, i.e., without any parentheses appended to the end of the name.

Continuing with process 200, the computing device passes the name of the second function and the range as arguments to the first function (step 203). In an implementation, when the formula is committed to the cell, the computing device parses the formula and identifies the cell range parameter and the function name parameter according to the definition of the first function. Upon identifying the non-anonymous function by its name, the computing device causes the first function to process the cell range in a manner specific to the first function using the non-anonymous function. In various implementations, the first function may aggregate cells in the cell range into one or more subarrays, each of which is iteratively processed by the non-anonymous function. For example, if the first function categorizes a cell range by row (e.g., BYROW), the first function calls the non-anonymous function to process each row of cells in the cell range, generating an output value for each row.

In some scenarios, the cells in a cell range are categorized by information in another cell range. For example, a user may wish to summarize column D of sales data according to the category data in column C for each cell in column D, wherein the categories are product types or years in which the sales occurred. The first function, such as a GROUPBY function, may be defined to receive the cell range parameter for data to be processed, a second cell range parameter comprising category data for the data, and the non-anonymous function name parameter. At execution, the first function categorizes the cells in the cell range by category and calls the non-anonymous function to process the cells for each category. The first function then populates the spreadsheet cells with output values organized by category, such as in the form of a table spilled across multiple rows and columns of the spreadsheet which summarizes the sales data according to category.

The computing device executes the first function, wherein the first function calls the second function and passes a value from the range as an argument to the second function (step 205). In an implementation, when the cell formula is entered or committed to the cell, the computing device executes the formula. To execute the formula, the computing device receives data from the cell range provided in the parameter list and organizes the data according to the first function (e.g., by column, by row, etc.). With the data organized, the computing device executes the second, non-anonymous spreadsheet function with respect to the data according to its organization. Where the cell range is organized into multiple groups, the computing device iteratively processes each group according to the second function with an output generated for each iteration.

The computing device populates the spreadsheet based on one or more results of the first function (step 207). In an implementation, with one or more results generated based on processing the cells in the cell range according to the non-anonymous function, the computing device updates the spreadsheet data and the spreadsheet display to display the one or more results. In other words, when multiple results are generated, the values of multiple cells are updated to display the multiple results generated according to the evaluation of the cell formula. Of the multiple cells, the top left cell contains the formula while the content of those cells is uneditable.

Referring again to FIG. 1, operational environment 100 includes a brief example of process 200 as employed by elements of operational environment 100 in an implementation. As illustrated in user experience 111(*b*), computing device 110 displays an application environment where a user submits input 117 relating to range 120 of cells in spreadsheet 115. The formula of input 117 includes spreadsheet function FUNC1 which is defined to receive at least two arguments, a range parameter ("range") and a function name parameter ("FUNC2"). For the purposes of illustration, FUNC1 will be assumed to be the BYCOL function, FUNC2 will be assumed to be the MAX function. For this example, the range parameter refers to range 120 which includes numerical values. The BYCOL function is defined to execute FUNC2 for each column in "range."

At execution, computing device 110 receives input 117 in cell 116 and identifies the BYCOL formula along with its two arguments. Computing device 110 passes the second function, MAX, along with the indicated cell range to BYCOL for execution. To execute the BYCOL function, the computing device passes the values in each column of range 120 to function MAX for processing. The function MAX receives the data sets corresponding to each of the columns of range 120 and determines the maximum value within each data set. As illustrated, range 120 includes three columns of data, so MAX is executed three times to produce a total of three outputs. Computing device 110 receives the three output values (i.e., the maximum data values for each column) resulting from the execution of BYCOL and populates three cells (cells 118) of spreadsheet 115 with new or updated values based on the output.

Figure 3:
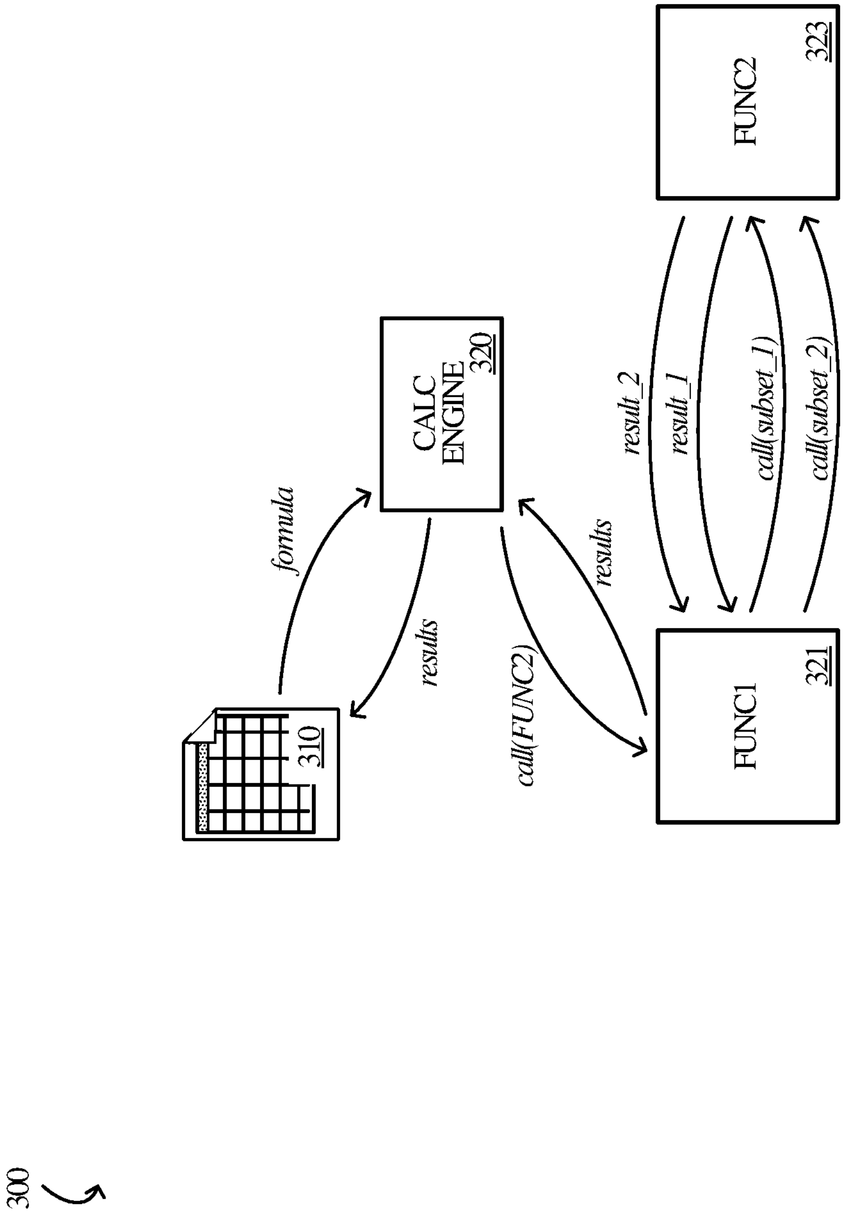
FIG. 3 illustrates an operational architecture for accepting a spreadsheet function as an argument of second spreadsheet function in an implementation.

FIG. 3 illustrates operational architecture 300 in an implementation, which is representative of a software architecture that supports the functionality for accepting a function as an argument to another function disclosed herein. For example, operational architecture 300 may be employed in the context of computing device 110 of operational environment 100 in FIG. 1. Operational architecture 300 includes spreadsheet 310 which is representative of a spreadsheet or functional data table, calc engine 320 which is representative of a calculation engine of an application which hosts spreadsheets, such as those of spreadsheet 310, and operations FUNC1 321 and FUNC2 323. FUNC1 321 is representative of an engine, operation, or functionality employed by calc engine 320 to execute some function according to columns of an indicated cell range. Examples of FUNC1 include BYCOL, BYROW, GROUPBY, and other functions which call a second function to execute over a cell range in particular manner, such as by organizing the cell range into subarrays which the second function processes in succession. FUNC2 323 is representative of an engine, operation, or functionality employed by calc engine 320 to perform an operation on values of one or more cells passed to it by a calling function (e.g., FUNC1). Operations can include calculations for numerical values (e.g., SUM, MAX), operations on text or string values (e.g., CONCATENATE, LEN), and so on.

In an exemplary operation illustrated in FIG. 3, calc engine 320 communicates with spreadsheet 310 by receiving formulas from spreadsheet 310 and returning results to spreadsheet 310 generated based on the formulas. Calc engine 320 in turn employs engines such as FUNC1 321 and FUNC2 323, to perform various operations to evaluate cell formulas. Calc engine 320 communicates with FUNC1 321 by sending a request to FUNC1 321 to orchestrate a call to FUNC2 323 for a specified cell range (not shown) and by receiving results based on the call. FUNC1 321, in turn, orchestrates one or more calls to FUNC2 323 to perform the operation of FUNC2 323 for the specified cell range (as illustrated, two calls are made to FUNC2 323).

Figure 4:
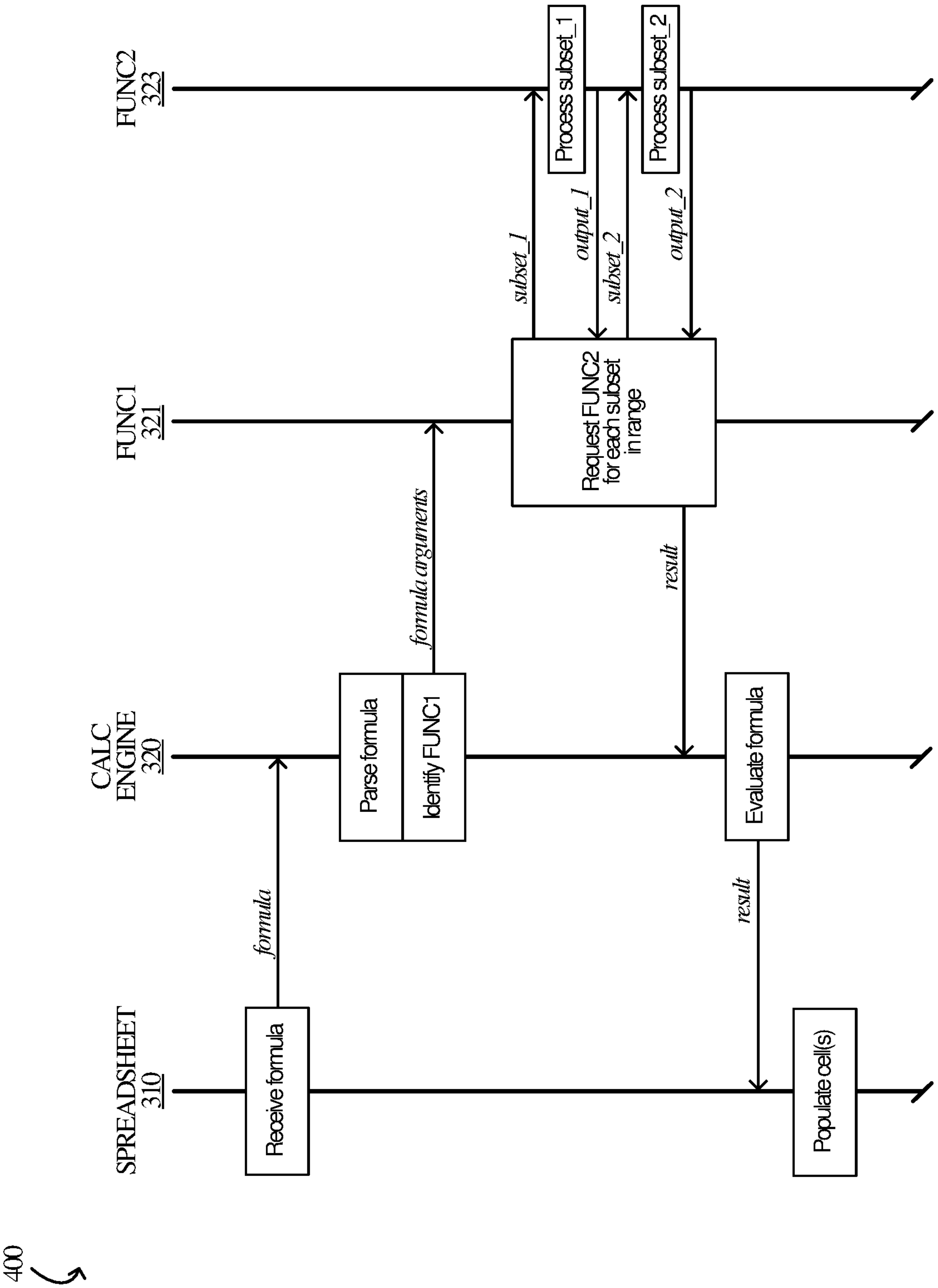
FIG. 4 illustrates an operational scenario for accepting a spreadsheet function as an argument of second spreadsheet function in an implementation.

FIG. 4 illustrates operational scenario 400 that is representative of an application of process 200, referring to the elements of operational architecture 300 for purposes of clarity. In an implementation, spreadsheet 310 receives input from a user including a formula for evaluation. Calc engine 320 receives the formula from spreadsheet 310 and parses the formula to identify the operations necessary for evaluating the formula. In an implementation, calc engine 320 identifies the function FUNC1 with a list of one or more arguments corresponding to the definition of the FUNC1 function and sends the list of arguments to FUNC1 321. The list of arguments includes a range or array of cells which are to be processed by FUNC2 323.

Upon receiving the list of arguments from calc engine 320, FUNC1 321 calls FUNC2 323 to process the cell range. As illustrated in operational scenario 400, the manner in which the cell range is to be processed is according to subsets of cells in the cell array. Accordingly, FUNC2 generates a process or subroutine for iteratively calling FUNC2 323 to process each of the subsets of the cell range. When the iterative calls to FUNC2 323 are complete, FUNC1 321 returns one or more results including the output values generated by FUNC2 323 to calc engine 320.

When calc engine 320 receives results from FUNC1 321, calc engine 320 proceeds with evaluating the formula based on the results. In some implementations, the calc engine 320 populates one or more cells of spreadsheet 310 based on the output values. In other implementations, the result of the FUNC1 function may be an input to yet another (i.e., higher order) spreadsheet function which calc engine 320 executes, the result of which is used to populate one or more cells of spreadsheet 310.

Figure 5:
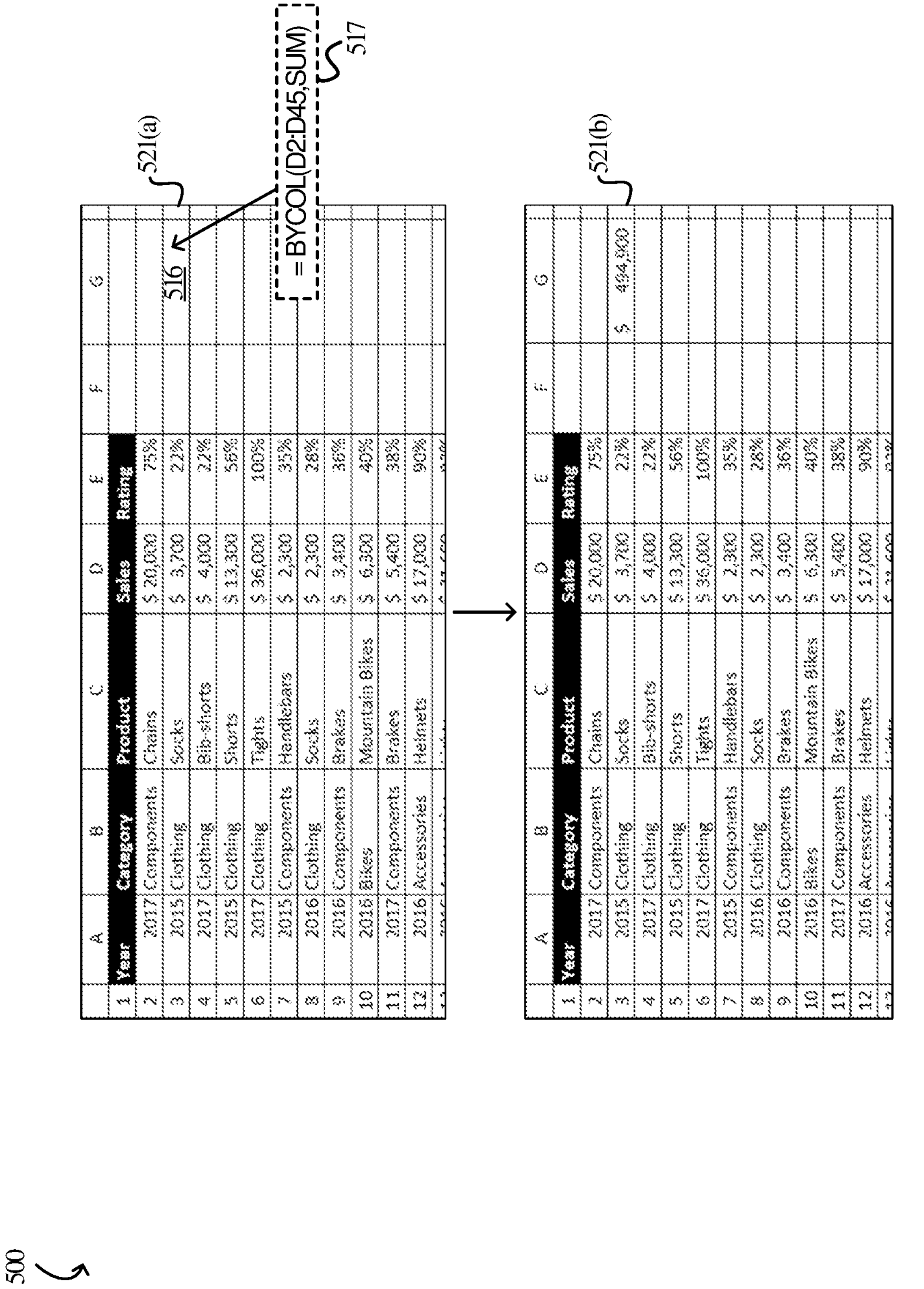
FIG. 5 illustrates an operational scenario for accepting a spreadsheet function as an argument of second spreadsheet function in an implementation.

FIG. 5 illustrates operational scenario 500 of the technology disclosed herein. In operational scenario 500, spreadsheet 521 (shown in various stages of operation as spreadsheet 521(*a*) and 521(*b*)) is hosted by a spreadsheet application and includes a data table with multiple columns of data.

In spreadsheet 521(*a*), a user enters input 517 in cell 516 including a formula which performs one or more operations on data in cells D2 through D45. A calc engine of the spreadsheet application identifies an outer function (BYCOL) along with a list of arguments corresponding to a definition of the function, including a cell range parameter and a function name parameter. The calc engine passes the list of arguments to the outer function for execution.

To execute the outer BYCOL function, BYCOL parses the cell range parameter to identify columns of cells (in this scenario, identifying a single column including cells D2 through D45). BYCOL passes the values in the column to the SUM function of the spreadsheet application for processing. After the cell range has been processed by SUM (in this scenario, a single iteration of processing), BYCOL returns the result to the calc engine. As illustrated in spreadsheet 521(*b*), the calc engine populates cell 516 with the result of executing the formula.

Figure 6:
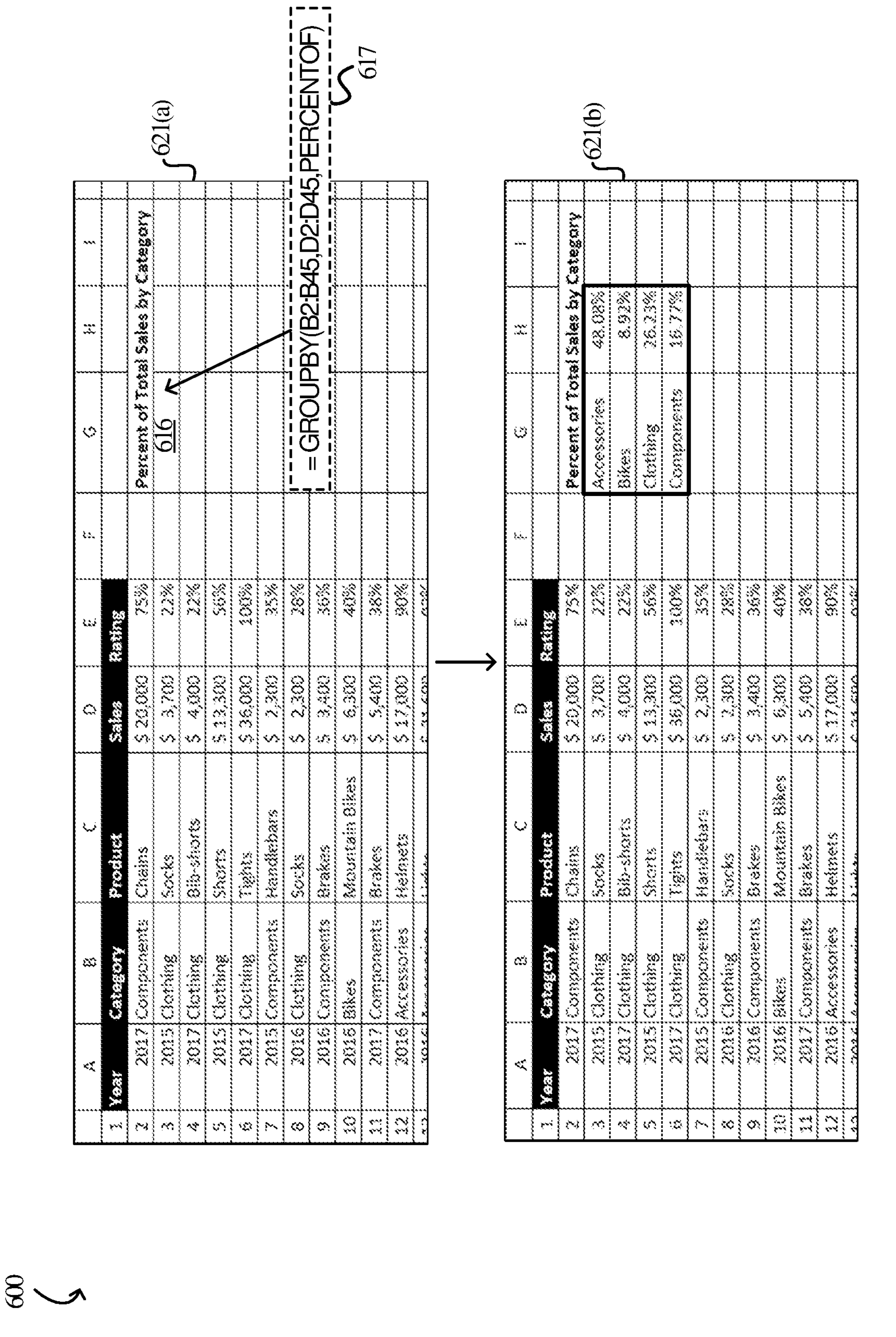
FIG. 6 illustrates an operational scenario for accepting a spreadsheet function as an argument of second spreadsheet function in an implementation.

Turning now to FIG. 6 illustrates operational scenario 600 of the technology disclosed herein. In operational scenario 600, spreadsheet 621 (shown in various stages of operation as spreadsheets 621(*a*) and 621(*b*)) is hosted by a spreadsheet application and includes a data table with multiple columns of data.

In spreadsheet 621(*a*), a user enters input 617 in cell 616 including a formula which performs one or more PERCENTOF operations on data in cells D2 through D45 according to data in cells B2 through B45. A calc engine of the spreadsheet application identifies an outer function GROUPBY along with a list of arguments corresponding to a definition of the function, including a category parameter, a cell range parameter, and a function name parameter. The calc engine passes the list of arguments to the GROUPBY function for execution.

To execute the outer GROUPBY function, GROUPBY parses the category parameter to identify categories by which to organize the cells indicated in the cell range parameter. Having identified four categories, the GROUPBY function sends the values in each category of cells to the function PERCENTOF for processing.

Continuing operational scenario 600, the non-anonymous function PERCENTOF is called by the GROUPBY function to process each of the identified cell categories. PERCENTOF is a non-anonymous user-defined function which computes a percentage for a subarray of cells based on a (total) cell range. As illustrated, the subarrays determined by GROUPBY correspond to the cell categories identified according to cells B2:B45. In an implementation, for a given category of the identified categories, GROUPBY parses cells D2:D45, identifies the cells corresponding to the given category, and iteratively calls PERCENTOF to compute a percent of the total sales for the given category with respect to the total sales of all cells D2:D45.

As illustrated, GROUPBY identifies four categories of products and computes a percentage of the total sales by category. As illustrated, the GROUPBY function generates an array of eight cells to display the result based on the number of unique category values in column B, with the first result column listing the categories and the second result column listing the corresponding percentage of the total sales.

FIG. 7 illustrates operational scenario 700 of the technology disclosed herein. In operational scenario 700, spreadsheet 721 (shown in various stages of operation as spreadsheets 721(*a*) and 721(*b*)) is hosted by a spreadsheet application and includes a data table with multiple columns of data.

In spreadsheet 721(*a*), a user enters input 717 in cell 716 including a formula which performs one or more AVERAGE operations on data in cells D2 through D45 according to corresponding data in cells A2:A45 and the Boolean expression ">10000." A calc engine of the spreadsheet application identifies the outer function AGGREGATEIF along with a list of arguments corresponding to a definition of the AGGREGATEIF function, including a conditional parameter, a category parameter, a cell range parameter, and a function name parameter. The calc engine passes the list of arguments to the AGGREGATEIF function for execution.

To execute the outer AGGREGATEIF function, AGGREGATEIF parses the category parameter to identify categories by which to organize the cells indicated in the cell range parameter. Having identified three categories, for each category, the AGGREGATEIF function sends the values which satisfy the Boolean condition to the function AVERAGE for processing.

Continuing operational scenario 700, the non-anonymous function AVERAGE is called by the AGGREGATEIF function to process each of the identified cell categories. AVERAGE is a non-anonymous function which computes an average value for a category or subarray of cells. As illustrated, the subarrays determined by AGGREGATEIF correspond to the cell categories identified according to cells A2:A45. In an implementation, for a given category of the identified categories, AGGREGATEIF parses cells D2:D45, identifies the cells corresponding to the given category, evaluates the cell values with respect to the Boolean condition, and iteratively calls AVERAGE to compute an average value for the given category for the values which satisfy the Boolean parameter.

As illustrated, AGGREGATEIF identifies three categories of sales year and computes an average of the sales greater than 10,000. As illustrated, the AGGREGATEIF function generates an array of six cells to display the result based on the number of unique year values in column A, with the first result column listing the sales year categories and the second result column listing the computed averages.

Figure 8:
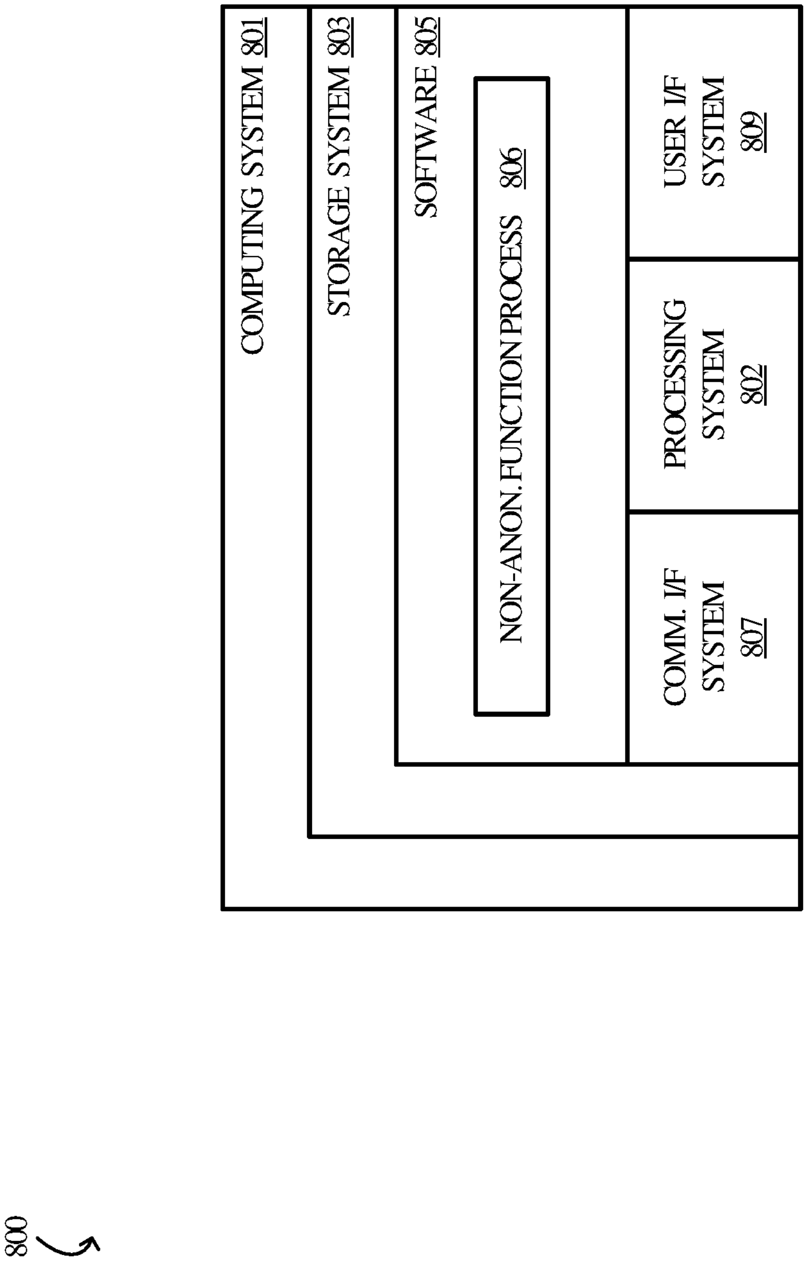
FIG. 8 illustrates a computing system suitable for implementing the various operational environments, architectures, processes, scenarios, and sequences discussed below with respect to the other Figures.

FIG. 8 illustrates architecture 800 illustrates computing device 801 that is representative of any system or collection of systems in which the various processes, programs, services, and scenarios disclosed herein may be implemented. Examples of computing device 801 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 801 may be implemented as a single apparatus, system, or device or may be implemented in a distributed manner as multiple apparatuses, systems, or devices. Computing device 801 includes, but is not limited to, processing system 802, storage system 803, software 805, communication interface system 807, and user interface system 809 (optional). Processing system 802 is operatively coupled with storage system 803, communication interface system 807, and user interface system 809.

Processing system 802 loads and executes software 805 from storage system 803. Software 805 includes and implements non-anonymous function process 806, which is (are) representative of the non-anonymous function processes discussed with respect to the preceding Figures, such as process 200. When executed by processing system 802, software 805 directs processing system 802 to operate as described herein for at least the various processes, operational scenarios, and sequences discussed in the foregoing implementations. Computing device 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including non-anonymous function process 806) may be implemented in program instructions and among other functions may, when executed by processing system 802, direct processing system 802 to operate as described with respect to the various operational scenarios, sequences, and processes illustrated herein. For example, software 805 may include program instructions for implementing a non-anonymous function process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing device 801 is representative) overall from a general-purpose computing system into a special-purpose computing system customized to support non-anonymous function processes in an optimized manner. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:

one or more computer readable storage media;

one or more processors operatively coupled with the one or more computer readable storage media; and program instructions stored on the one or more computer readable storage media that, when executed by the one or more processors, direct the computing apparatus to at least:

identify a formula in a cell of a spreadsheet, wherein the formula includes a first function having a parameter comprising a name of a second function, wherein the formula further includes a parameter comprising one or more values, and wherein the second function comprises a non-anonymous function that is passed by name only without an argument and lacks function notation;

pass the name of the second function as an argument to the first function;

identify a common characteristic based on the first function;

aggregate the one or more values into one or more subarrays according to the common characteristic;

execute the first function, wherein the first function iteratively calls the second function and passes each of the one or more subarrays as an argument to the second function; and populate the spreadsheet based on one or more results of the first function.

2. The computing apparatus of claim 1, wherein the common characteristic comprises one of: cell column, cell row, cell format, and cell value.

3. The computing apparatus of claim 1, wherein the formula follows a syntax comprising: a name of a function followed by a list of parameters captured parenthetically after the name of the function, and wherein one parameter in the list of parameters identifies another function to be passed as an argument to the function along with at least one other of the list of parameters.

4. The computing apparatus of claim 3, wherein the program instructions further direct the computing apparatus to generate a subroutine for iteratively calling the second function to process each of the one or more subarrays.

5. The computing apparatus of claim 4, wherein the list of parameters comprises a conditional expression, and wherein the first function, when calling the second function, passes a value from the one or more values to the second function if the value satisfies the conditional expression.

6. The computing apparatus of claim 1, wherein the parameters do not include a LAMBDA function and wherein the one or more values comprise a group of cells in the spreadsheet.

7. The computing apparatus of claim 6, wherein the first function comprises a BYCOL function and wherein the second function comprises one of a native function and a user-defined function of a spreadsheet application.

8. The computing apparatus of claim 1, wherein a syntax of the parameters includes the one or more values and a name but does not include any parameters to be explicitly included for the second function.

9. A method of operating a spreadsheet application, comprising:

receiving a formula in a cell of a spreadsheet;

identifying, in the formula, a first function having a parameter comprising a name of a second function, wherein the formula further includes a parameter comprising one or more values, and wherein the second function comprises a non-anonymous function that is passed by name only without an argument and lacks function notation;

passing the name of the second function as an argument to the first function;

identifying a common characteristic based on the first function;

aggregating the one or more values into one or more subarrays according to the common characteristic;

executing the first function, wherein the first function iteratively calls the second function and passes each of the one or more subarrays as an argument to the second function; and populating the spreadsheet based on one or more results of the first function.

10. The method of claim 9, wherein the common characteristic comprises one of: cell column, cell row, cell format, and cell value.

11. The method of operating the spreadsheet application of claim 9, wherein the formula follows a syntax comprising: a name of a function followed by a list of parameters captured parenthetically after the name of the function, and wherein one parameter in the list of parameters identifies another function to be passed as an argument to the function along with at least one other of the list of parameters.

12. The method of operating the spreadsheet application of claim 11, further comprising generating a subroutine for iteratively calling the second function to process each of the one or more subarrays.

13. The method of operating the spreadsheet application of claim 12, wherein the list of parameters comprises a conditional expression, and wherein the first function, when calling the second function, passes a value from the one or more values to the second function if the value satisfies the conditional expression.

14. The method of operating the spreadsheet application of claim 9, wherein the parameters do not include a LAMBDA function and wherein the one or more values comprise a group of cells in the spreadsheet.

15. The method of operating the spreadsheet application of claim 14, wherein the first function comprises a BYCOL function and wherein the second function comprises one of a native function and a user-defined function of the spreadsheet application.

16. The method of operating the spreadsheet application of claim 9, wherein a syntax of the parameters includes the one or more values and a name but does not include any parameters to be explicitly included for the second function.

17. One or more computer readable storage media having program instructions stored thereon that, when executed by one or more processors of a computing device, direct the computing device to at least:

identify a formula in a cell of a spreadsheet, wherein the formula includes a first function having a parameter comprising a name of a second function, wherein the formula further includes a parameter comprising one or more values, and wherein the second function comprises a non-anonymous function that is passed by name only without an argument and lacks function notation;

pass the name of the second function as an argument to the first function;

identify a common characteristic based on the first function;

aggregate the one or more values into one or more subarrays according to the common characteristic;

execute the first function, wherein the first function iteratively calls the second function and passes each of the one or more subarrays as an argument to the second function; and populate the spreadsheet based on one or more results of the first function.

18. The one or more computer readable storage media of claim 17, wherein the formula follows a syntax comprising: a name of a function followed by a list of parameters captured parenthetically after the name of the function, and wherein one parameter in the list of parameters identifies another function to be passed as an argument to the function along with at least one other of the list of parameters.

19. The one or more computer readable storage media of claim 18, wherein the program instructions further direct the computing device to generate a subroutine for iteratively calling the second function to process each of the one or more subarrays.

20. The one or more computer readable storage media of claim 19, wherein the list of parameters comprises a conditional expression, and wherein the first function, when calling the second function, passes a value from the one or more values to the second function if the value satisfies the conditional expression.

* * * * *